United States Patent [19]

Mizuno et al.

[11] Patent Number: 4,539,642
[45] Date of Patent: Sep. 3, 1985

[54] FAIL-SAFE SPEED CONTROL SYSTEM FOR MOTOR VEHICLES

[75] Inventors: Yoshikazu Mizuno; Akira Ikuma, both of Aichi, Japan

[73] Assignee: Nippondenso Co., Ltd., Kariya, Japan

[21] Appl. No.: 400,085

[22] Filed: Jul. 20, 1982

[30] Foreign Application Priority Data

Jul. 21, 1981 [JP] Japan ................................. 56-114019

[51] Int. Cl.³ ............................................. G06F 15/50
[52] U.S. Cl. ................................ 364/426; 364/431.07; 361/236; 371/14
[58] Field of Search .............. 364/426, 431.07, 431.11; 371/14, 21, 71; 361/236, 242

[56] References Cited

U.S. PATENT DOCUMENTS

| | | | |
|---|---|---|---|
| 3,940,601 | 2/1976 | Henry et al. | 371/71 |
| 4,072,206 | 2/1978 | Larson et al. | 364/426 |
| 4,138,723 | 2/1979 | Nehmer et al. | 364/426 |
| 4,191,996 | 3/1980 | Chesley | 371/21 |
| 4,209,828 | 6/1980 | Anderson et al. | 364/426 |
| 4,268,905 | 5/1981 | Johann et al. | 371/21 |
| 4,270,176 | 5/1981 | Skarvada | 364/426 |
| 4,328,776 | 5/1982 | Kuno et al. | 364/431.07 |
| 4,386,427 | 5/1983 | Hosaka | 364/431.11 |

Primary Examiner—Jerry Smith
Assistant Examiner—Louis Woo
Attorney, Agent, or Firm—Cushman, Darby & Cushman

[57] ABSTRACT

An automatic speed control system comprises a bistable device, a coincidence gate and a monitor circuit which monitors the speed control element of an engine and applies a first input signal to the coincidence gate if malfunction occurs in the speed control element. The coincidence gate provides a reset signal to the bistable device when it simultaneously receives a second input signal from a microprocessor. The microprocessor verifies the operating conditions of the bistable device before the system is switched to automatic mode and sets the bistable device into a condition for receiving the reset signal from the coincidence gate. During automatic control mode, the microprocessor constantly checks the bistable device if it turns to the reset condition while controlling the speed control element. Whenever the microprocessor detects a reset condition in the bistable device, it enables the speed control element to allow the engine to be controlled on manual mode. A malfunction of the microprocessor will also cause the coincidence gate to provide a reset signal to the bistable device.

9 Claims, 9 Drawing Figures

| VEHICLE SPEED (Km/h) | SET VALUE (HEXA-DECIMAL) | MEAS'D INT'VAL (PLS COUNT) | COMPUTED PULSE COUNT | DIVIDEND (HEXA-DECIMAL) | VEHICLE SPEED COMPUTATION FORMULA |
|---|---|---|---|---|---|
| 0~66 | F | 1 | 4 | 0F6F20 | $SPD = \frac{1}{2}(SPDO + \frac{D}{T})$<br><br>SPD = CURRENT VEHICLE SPEED<br><br>SPDO = OLD VEHICLE SPEED<br><br>D = DIVIDEND<br><br>T = PRELIMINARY VCL SPD PULSE INTERVAL |
| 66~106 | E | 2 | 8 | 1EDE40 | |
| 106~146 | D | 3 | 12 | 2E4D60 | |
| 146~200 | C | 4 | 16 | 3DBC80 | |

FAIL-SAFE SPEED CONTROL SYSTEM FOR MOTOR VEHICLES

BACKGROUND OF THE INVENTION

The present invention relates to an automatic vehicle speed control system.

Automatic vehicle speed control systems known in the art comprise a speed control mechanism which controls an input variable of the vehicle engine according to a feedback control signal which is derived from a controller as an indication of the deviation of the vehicle speed from a reference setting.

There is a general tendency in recent years toward installing a variety of additional control functions which are economically made possible by the introduction of high technology electronic circuits. These additional functions include, for example, a diagnostic feature that examines the various components of the vehicle to give an early warning if a failing part is detected, an automatic navigator that allows the vehicle occupant to follow the directions given by computer-derived information, and automatic vehicle speed control that generates speed change signals in cooperation with an automatic power transmission. This inevitably results in an increase in the necessary keys and switches which must be arranged on the instrument panel and also gives rise to reliability problems. To meet the space limitations of the instrument panel and to the increasing instances of failure, provision is made to assign dual functions to a single switch to minimize the number of components and the space to be occupied. It is also required that such systems be designed from the safety standpoint and reliable components be used throughout the system.

SUMMARY OF THE INVENTION

It is therefore an object of the present invention to provide an automatic speed control system for a motor vehicle having a fail-safe feature which shuts down the system when a failure has developed at critical points of the system to avoid any danger which might arise from the failure.

The speed control system of the present invention includes a speed control mechanism responsive to a speed control signal for varying an input variable to the motor of the vehicle, means for generating a signal representative of the speed of the vehicle, means for monitoring an operating condition of the system to give an indication for disabling the speed control signal, and manual switch means for generating a command signal indicating the enablement of the speed control signal. A memory is provided for storing signals for indicating the enablement and disablement of the speed control signal. The memory is controlled by a microcomputer which writes an enabling signal into the memory in response to the start of operation of the speed control system as well as to the command signal and a disabling signal into the memory in response to the indication of the monitored condition. The microcomputer is programmed to detect the difference between the speed signal and a reference value to generate therefrom the speed control signal to reduce the difference and to constantly monitor the contents of the memory. When the disabling signal is present in the memory the speed control signal is disabled and when the enabling signal is present the control signal is reenabled.

If a failure should occur in the control system, a disabling signal is stored in the memory and the microcomputer reads the disabling signal to disable the speed control signal to allow the vehicle engine to be manually controlled.

The memory is preferably a bistable device to represent the enabling and disabling signals by binary states. The bistable device is physically separated from the microcomputer to ensure operation in the event of the microcomputer not properly functioning.

In a preferred embodiment of the invention, the microcomputer is programmed to execute an inspection routine prior to the start of the speed control system to check whether the memory is properly functioning by writing a test signal into and reading it from the memory.

Another object of the invention is to provide a speed control system having a pulse generator for generating pulses at a frequency proportional to the speed of the vehicle and a microcomputer which is programmed to count the speed pulses to detect the speed of the vehicle and selectively count the pulses as a function of the detected speed and measure the interval between the selectively counted pulses. The measured interval is utilized to give an accurate indication of the speed of the vehicle. This eliminates the use of a large counting capacity which would be needed to measure the vehicle speed with precision for a wide range of speed variations.

BRIEF DESCRIPTION OF THE DRAWINGS

The present invention will be described in further detail with reference to the accompanying drawings, in which:

FIG. 3, shown in separate sheets 3a, 3b, 3c, is a flow diagram associated with the microcomputer of FIG. 2;

DETAILED DESCRIPTION

Figure 1:
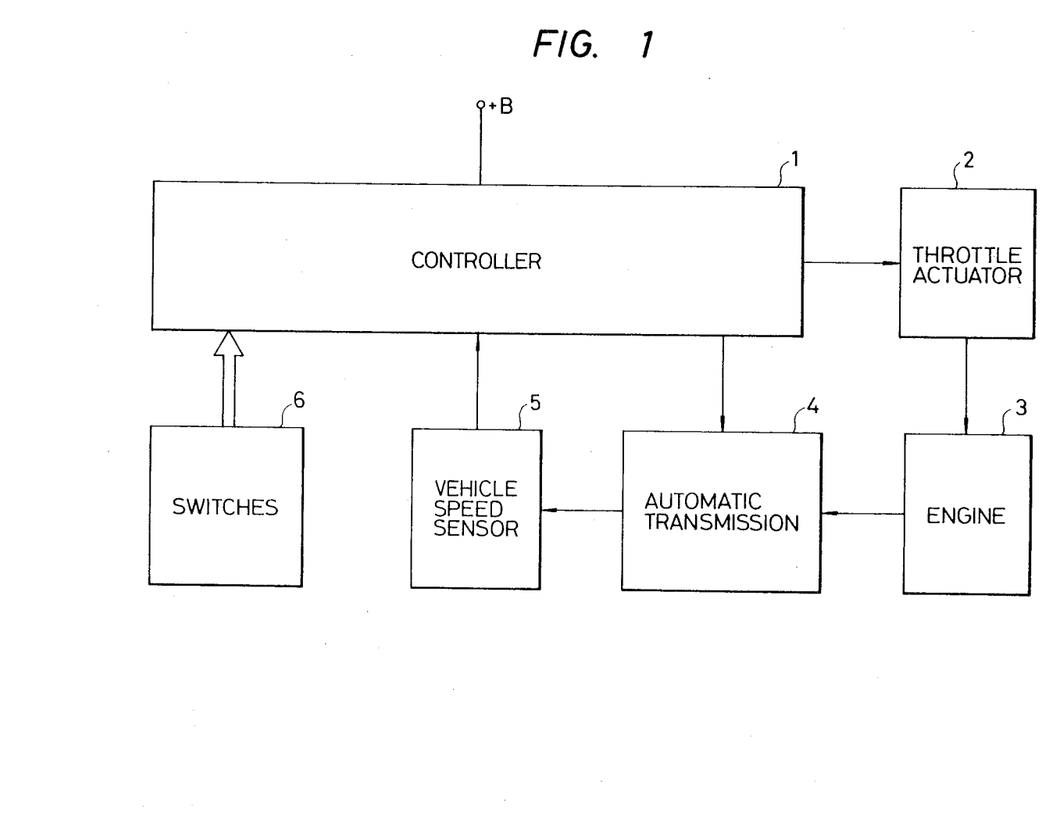
FIG. 1 is an illustration of a schematic block diagram of the speed control system embodying the invention.

Referring now to FIG. 1, the vehicle speed control system of the invention comprises a microcomputer-based controller 1, a vacuum operated throttle actuator 2 responsive to an output signal from the controller 1 to operate the throttle of an internal combustion engine 3, a vehicle speed sensor 5 for application of a vehicle speed signal to the controller 1 which is derived from an automatic transmission 4 coupled to the engine 3, and a plurality of control switches 6 associated with the controller. The automatic transmission 4 is of a known electronically controlled type which responds to a speed control signal from the controller by operating a solenoid to change the gear ratio. The vehicle speed sensor 5 includes a reed switch which is arranged to be operated in response to the magnetic flux generated by a permanent magnet rotating with the known speedometer cable of the vehicle. Typically, the vehicle speed sensor 5 generates four pulses for each revolution of the speedometer cable which turns a few hundreds revolutions per minute at a speed of 60 km/h.

Figure 2:
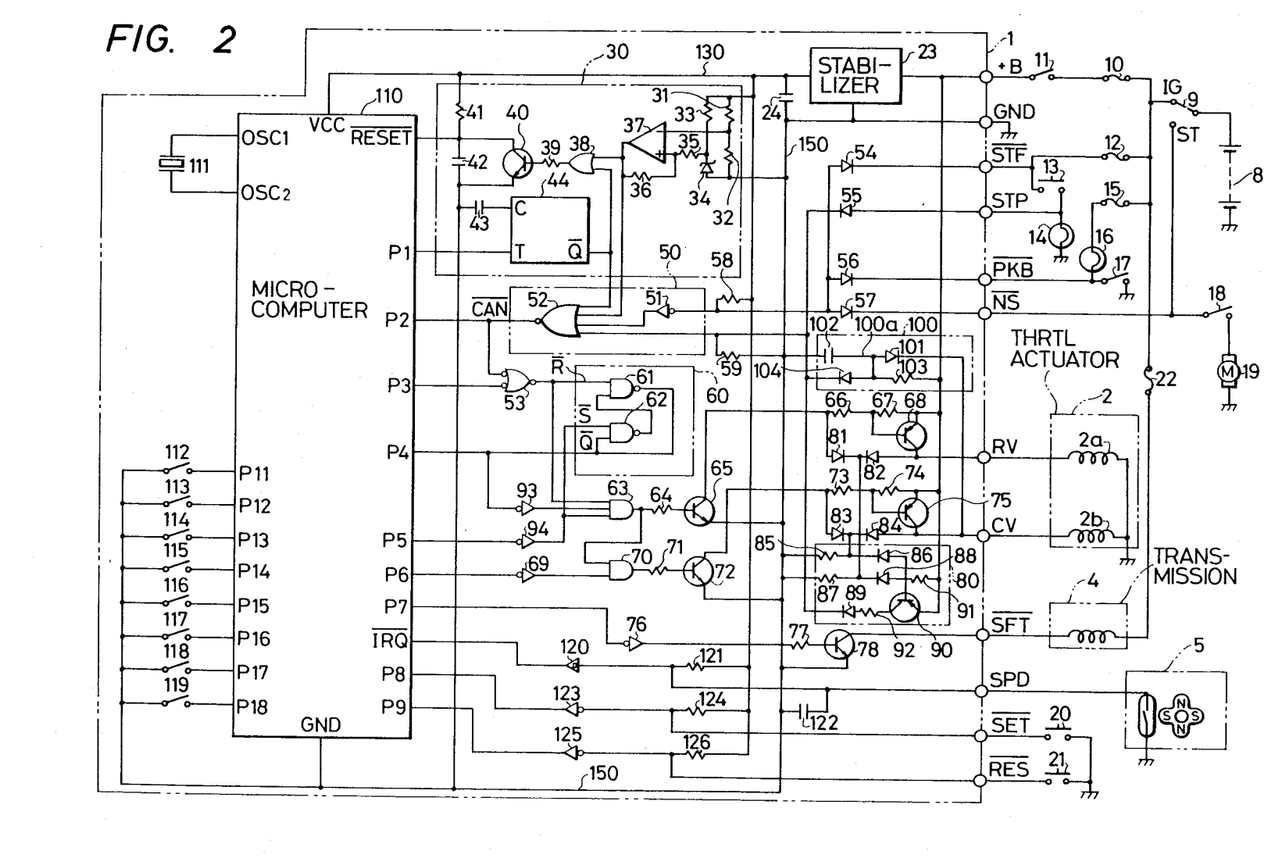
FIG. 2 is an illustration of the details of the system of FIG. 1.

FIG. 2 is an illustration of the details of the control system of the invention. The controller 1 is powered by a battery 8 of which the negative terminal is coupled to the vehicle body and the positive terminal is coupled by an ignition switch 9 to a terminal IG or a terminal ST. The terminal IG is a power source for the ignition system of the engine and is connected to various parts of the system including speed control fuse 10, stop lamp fuse 12, parking brake fuse 15 and transmission control fuse 22. The ST terminal of the ignition key switch 9 is connected to an $\overline{\text{NS}}$ terminal of the controller 1 and to a neutral switch 18 and thence to a starter motor 19 which is connected to the vehicle body. The fuse 10 is coupled to a power switch 11 which in turn is coupled to a +B terminal. The stop fuse 12 is coupled to an $\overline{\text{STF}}$ terminal of the controller 1 and to a stop switch 13 which is coupled to an STP terminal of the controller 1 and to a stop lamp 14 which is grounded. The parking brake fuse 15 has its one terminal coupled to a parking brake lamp 16 which is coupled to a PKB terminal of the controller 1 and also to a parking brake switch 17 which is grounded.

The solenoid of the automatic transmission 4 has its one end coupled by fuse 22 to the IG terminal and its other end coupled to an SFT terminal of the controller 1.

The vacuum operated throttle actuator 2 comprises a release valve operated by a solenoid 2a and a control valve operated by a solenoid 2b. The release valve is adapted to close the vacuum chamber of the actuator when solenoid 2a is energized and open the chamber to release the pressure inside to the atmosphere when the solenoid is de-energized. The control valve is adapted for controlling the passages of atmospheric and vacuum pressures leading to the vacuum chamber on an ON-OFF fashion to control the position of the throttle valve of the engine 3. The release valve drive solenoid 2a and control valve drive solenoid 2b, coupled at one end to the ground, are respectively connected to terminals RV and CV of the controller 1. The vehicle speed sensor 5 is connected between the vehicle body and a SPD terminal of the controller 1. A SET/COASTING switch 20 and a RESUME/ACCELERATOR switch 21 are arranged to apply a ground potential to terminals $\overline{\text{SET}}$ and $\overline{\text{RES}}$.

The speed controller 1 comprises a known microcomputer 110 which operates on a clock supplied from a quartz oscillator 111 and includes a read only memory storing programmed instructions for the microprocessor, a random access memory for temporary storage of intermediate results of operations, various registers, and an 8-bit internal timer.

Indicated at 23 is an IC voltage stabilizer which is coupled to the terminal +B and ground terminal GND to provide a constant DC voltage on a power line 130. A filter capacitor 24 is coupled between lines 130 and 150. Illustrated at 44 is a failure detector for detecting a malfunction of the microcomputer 110. The failure detector 44 has one input "T" coupled to a terminal P1 of the microcomputer to receive pulses at intervals Tp to compare the pulse interval Tp with an interval Tc determined by the time constant of a capacitor 43 coupled to an input "C" thereof. The failure detector 44 generates a low voltage output when Tp is smaller than Tc and a high voltage output when Tp is larger than Tc.

Illustrated at 30 is a reset circuit for resetting the microcomputer 110. The reset circuit is formed by a voltage comparator 37 having its inverting input terminal coupled to a voltage divider formed by resistors 31 and 32 connected between power lines 130 and 150 and its noninverting input terminal coupled to a reference voltage source formed by a resistor 33, a Zener diode 34 and an input resistor 35. A positive feedback resistor 36 is connected between the noninverting input and the output of the comparator 37. The output of the comparator 37 is coupled to an OR gate 38 and to a NOR gate 52.

The failure detector 44 forms part of the reset circuit and has its output coupled to the OR gate 38 and to the NOR gate 52. The output of OR gate 38 is coupled by a resistor 39 to the base of a resetting transistor 40 of which the collector is coupled by a resistor 41 to the power line 130 and to a reset input RESET of the microcomputer and its emitter is coupled to line 150. A delay capacitor 42 is provided beween the collector and emitter of the transistor 40.

The microcomputer is provided with a cancel command input P2 coupled to the output of the NOR gate 52. A low level input to the terminal P1 indicates the presence of a cancel command signal. The NOR gate 52 further takes a third input from an inverter 51 and a fourth input from the cathode terminals of diodes 55, 104 and 89. To the input of the inverter 51 is connected the anodes of diodes 54, 56 and 57, the diode 54 having its cathode coupled to the $\overline{\text{STF}}$ terminal, the diode 56 having its cathode coupled to the $\overline{\text{PKB}}$ terminal, and the diode 57 having its cathode coupled to the NS terminal. The diode 55 has its anode coupled to the STP terminal.

Illustrated at 60 is a bistable circuit formed by a pair of NAND gates 61 and 62. The reset input of the bistable circuit 60 is coupled to the output of NOR gate 53 and to an AND gate 63. The NOR gate 53 has one input connected to the P2 input of the microcomputer 110 and its another input coupled to a terminal P3 of the microcomputer. An output terminal P5 of the microcomputer 110 is coupled by an inverter 94 to AND gates 62 and 63. The output of the bistable circuit 60 is connected to an input terminal P4 of the microcomputer 110 and to an input of the AND gate 63 via an inverter 93. The AND gate 63 makes a logical decision for operating the solenoid 2a of the throttle actuator 2 and has its output coupled to an input of an AND gate 70 and to the base of a transistor 65 via resistor 64. The emitter of the transistor 65 is connected to the ground line 150 and its collector coupled to the anode of a failure detecting diode 81 and to the base of a power transistor 68 through a resistor 66. A resistor 67 is connected between the emitter and base of the power transistor 68. The power transistor 68 has its emitter coupled to the power input terminal +B and its collector coupled to the anode of a failure detecting diode 82 and also to the terminal RV.

The AND gate 70 takes its another input from an output terminal P6 of the microcomputer 110 via an inverter 69. The output of the AND gate 70 is connected via a resistor 71 to the base of a transistor 72 of which the emitter is coupled to the ground line 150 and its collector is coupled to the anode of a failure detecting diode 83 and also to the base of a power transistor 75 via a resistor 73. The collector of the power transistor 75 is coupled to the anode of a failure detecting diode 84 and also to the terminal CV.

Illustrated at 80 is an actuator failure detector comprising a transistor 90 having its base coupled by a diode 86 to a junction between diodes 83 and 84 and also to the ground line 150 via a resistor 85. The collector of the transistor 90 is coupled by a circuit including a resistor 92 and diode 89 to an input of the NOR gate 52 and its emitter is coupled to the +B terminal. Between the base and emitter of the transistor 90 is connected a resistor 91 and to the base of which is connected the anodes of diodes 86 and 88. The cathode of the diode 88 is connected to the junction of diodes 81 and 82 and coupled by a pull-down resistor 85 to the ground line 150.

The operation of the actuator failure detector 80 is as follows. When the transistor 65 is nonconductive and the anode of diode 81 is at potential +B, the release valve operating transistor 68 is turned off, and driving the anode of diode 82 to a low voltage level. If the transistor 65 is conductive and the anode of diode 81 is driven to a low voltage, the transistor 68 is turned on to raise the anode of diode 82 to +B potential. In other words, when the actuator 2 is properly functioning, either one of the diodes 81 and 82 has a high anode voltage (+B) and current is drained from the junction of diodes 81 and 82 to the pull-down resistor 87 and there is no current flow in the diode 88. The same circuit action occurs in the circuit formed by transistors 72, 75, resistors 73, 74 and diodes 83 and 84, so that current is drained from the junction of diodes 83 and 84 to the resistor 85 and there is no current flow in the diode 86. Therefore, the transistor 90 is biased into nonconduction by the pull-up resistor 91 providing a low voltage input to the NOR gate 52 and no "cancel" signal is generated. However, if the release valve operating solenoid 2a is short circuited, the transistor 65 is turned on and a current is drained from the resistor 87 to the diode 88 to turn on the transistor 90 raising its collector voltage to +B to apply a high voltage input to the NOR gate 52 generating a "cancel" command signal therefrom. In like manner, if the control valve operating solenoid 2b is short circuited, a current is drained to the diode 86 from the resistor 85 to turn on the transistor 90 to generate a "cancel" signal.

Illustrated at 78 is a power transistor having its emitter-collector path connected between the ground line 150 and the terminal $\overline{\text{SFT}}$ to which the solenoid of the power transmission 4 is connected. The base of the power transistor 78 is coupled by a resistor 77 and an inverter 76 to an output terminal P7 of the microcomputer 110.

Indicated at 100 is a duty ratio failure detector which comprises a diode 101 having its cathode coupled to the collector of the power transistor 75 and its anode coupled to the junction between diode 104 and resistor 103 and capacitor 102. The resistor 103 is coupled to the terminal +B and the capacitor 102 is coupled to the ground line 150.

The duty ratio failure detector 100 operates as follows. When the microcomputer 110 is operating in a speed-control mode (control-enabled mode) in a manner as will be described, the control valve operating solenoid 2b is energized with a duty ratio in a range from 0% to 90% so that the potential at terminal CV varies between high and low voltages at intervals T2 (several tens of milliseconds). More specifically, during the turn-off time of the solenoid 2b the potential at the junction 100a between diode 101 and capacitor 102 is driven to a voltage level higher than the ground potential by an amount equal to the forward bias voltage of diode 101. Since the cathode of diode 104 is driven to the ground potential by the pull-down resistor 59, the NOR gate 52 is impressed with a low voltage input and no "cancel" signal is generated if the other inputs of the NOR gate 52 are supplied with low voltages. During the turn-on time of the solenoid 2b, the terminal CV is raised to potential +B. The potential at the junction 100a is determined by the time constant of the pull-up resistor 103 and capacitor 102. The maximum open time of the control valve of the actuator 2 is 9/10 of the interval T2, so that with a time constant value of a few hundreds milliseconds the potential applied to the NOR gate 52 from the junction 105a is low and no "cancel" signal is generated. However, if the microcomputer has failed to properly execute its programmed instructions (eg. miscalculation or low clock frequency) and as a result the solenoid 2b remains energized for an extended period of time, the potential at the junction 100a is driven to a high voltage level and the NOR gate 52 issues a "cancel" command signal to the microcomputer 110.

A vehicle speed signal from the sensor 5 is supplied through the input terminal SPD to a Schmitt trigger 120 the output of which is connected to an interrupt terminal $\overline{\text{IRQ}}$ of the microcomputer 110. A capacitor 122 and a resistor 121, coupled to the input of the Schmitt trigger 120, eliminates undesirable noise components.

The set input terminal $\overline{\text{SET}}$ is connected to an input terminal P8 of the microcomputer via an inverter 123 and the terminal RES is coupled by an inverter 125 to an input terminal P9 of the microcomputer. Resistors 124 and 126 are pull-up resistors coupled from these input terminals to the power line 130.

When the ignition key switch 9 and the power switch 11 are operated, a battery voltage (+12 V) is supplied from the battery 8 to the +B terminal and a constant DC voltage (+5 V) is provided from the stabilizer 23. If the voltage at line 130 is not sufficient to operate the microcomputer 110 the voltage at the noninverting input of the comparator 37 is lower than the reference voltage determined by the Zener diode 34 so that the comparator 37 generates a high voltage output and drives the transistor 40 into conduction causing the capacitor 42 to rapidly discharge. The voltage at the RESET input of the microcomputer 110 is thus switched to a low voltage level to reset the microcomputer. In this reset condition the output terminals P1, P3, P5, P6 and P7 are raised to a high voltage level. With the output terminals P5 and P6 being at high voltage level the release and control valves of the actuator 2 are in the open condition in a manner as will be described.

If the voltage at line 130 reaches the operating level of the microcomputer, the output of the comparator 37 switches to a low voltage level. If there is no change in input to the T terminal of detector 44, the output thereof will switch between high and low voltage levels, so that the output of OR gate 38 switches between high and low voltages and therefore the transistor 40 is turned on and off in response thereto.

The microcomputer is programmed so that it causes the binary state of the terminal P1 to change at intervals of several tens of milliseconds in response to the execution of critical steps of the program. This signal triggers the detector 44 to cause its output to remain in a low voltage level. If malfunction occurs and the microcomputer 110 fails to execute the critical steps of the program, no changes occur in the output terminal P1 and the output of the failure detector 44 and therefore the OR gate 38 switches to a high output state. The transistor 40 is thus rendered conductive to cause the microcomputer 110 to be reset for reinitiating the execution of its program.

As described above, the reset input of the microcomputer 110 is temporarily switched to low voltage level to cause its output terminals P1, P3, P5, P6 and P7 to be initialized to high voltage level whenever power switch 11 is closed. In this initialized condition the transistor 65 is turned off. The resistor 87 has a resistance valve 10 times higher than that of resistor 66. Due to the relative values of these resistors, the transistor 68 is turned off in response to the turn-off of transistor 65 and the release valve solenoid 2a remains de-energized. Similarly, the AND gate 70 is switched to a low output state so that the control valve solenoid 2b likewise remains de-energized. The transistor 78 is also turned off and the circuit for the solenoid of the automatic transmission 4 is open. Further provided is a set of manual switches 112 to 119. These switches are used to alter the setting of the stored program.

The operation of the microcomputer 110 will now be described with reference to the flow diagram illustrated in FIGS. 3 to 6. The microcomputer 110 starts operating by executing an initializing routine shown in a block 210 when the reset input thereof is raised to a high voltage level in response to the operation of power switch 11 at step 200. The initializing routine 210 comprises a sequence of execution steps shown in blocks 211 to 215. In Step 211 the microcomputer applies a test to the bistable circuit 60 in a manner shown in FIG. 4. In block (1) the microcomputer checks to see if the terminal P2 is high and if so it goes to a block (2) and if not it repeats this process until a high voltage appears at terminal P2. In block (2) the terminals P3 and P5 are raised to a high voltage level to trigger the bistable circuit 60 into a set condition and a block (3) is executed to test whether the bistable circuit 60 has actually been triggered into set condition. If the bistable circuit 60 is properly functioning, a low voltage appears at the terminal P4 and the control now exits to a block (4) to switch the terminal P3 to a low voltage level, resetting the bistable circuit 60, and if not the blocks (1) to (3) will be repeatedly executed until the terminal P4 is raised to a high voltage level. A block (5) checks to see which one of the setting and resetting signals is generated earlier than the other for the purpose of verifying whether the bistable circuit operates in the proper order of priority. If the bistable circuit operates properly, and a high voltage appears at the terminal P4 and control exits to a block (6), and if not it returns to the block (1). In block (6) a low voltage is applied to the output terminal P5 to provide a resetting signal to the bistable circuit 60 after the vehicle has attained a constant speed. If the bistable circuit is normally operating, the low voltage at terminal P5 will trigger it into reset condition and the voltage at terminal P4 switches to a high level. The latter condition is ascertained in block (7) and controls exits to block (8) if the high level condition is detected at terminal P4, and if not control returns to the block (1). The bistable circuit 60 is initialized in block (8) by application of a high voltage to the terminals P3 and P5 so that terminal P4 switches to a low voltage level. By the checking routine 211 just described, the operating states of logic elements 53, 61, 62 and 94 are also ascertained. If all of these elements are properly functioning the next routine 212 is executed, and if not, the bistable check routine 211 will be repeatedly executed.

Returning to FIG. 3a, the microprocessor now proceeds to subroutine 212 to check whether its random access memory is properly functioning by writing hexadecimal check data (FFF) into all the storage cells of the RAM and reading the stored data for comparison with the input data to verify coincidence therebetween The RAM verification routine 212 is followed by a step 213 in which the contents of the RAM are initialized and then followed by a timer initializing step 214 in which an 8-bit counter is reset to zero. When this counter is overflowed an interrupt is generated to execute a timer interrupt routine which will be described with reference to FIG. 5. The timer interrupt routine 214 is followed by a vehicle speed detect interrupt routine 215 which is initiated in response to the trailing edge of a vehicle speed pulse applied to the IRQ input thereof to allow control to exit to an interrupt routine to measure the vehicle speed as will be described with reference to FIG. 6. During the execution of the main routine that follows the microcomputer interrupts the main routine to execute timer interrupt routines at intervals of a several tens of milliseconds and vehicle speed detect interrupt routines.

Figure 5:
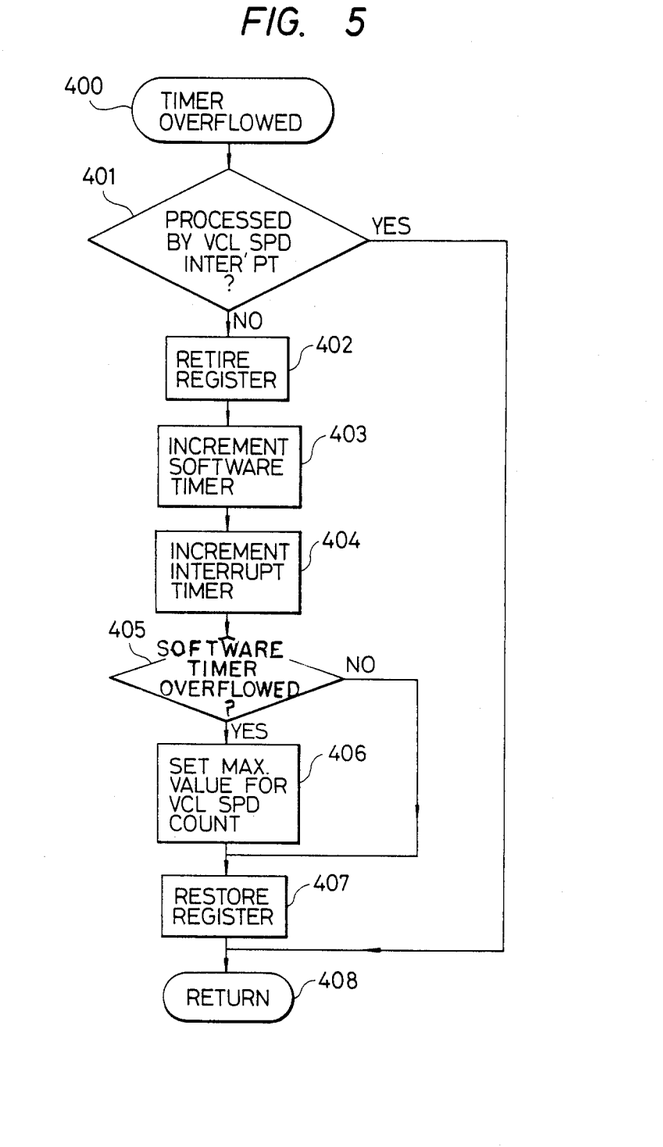
FIGS. 5 and 6 are illustrations of flow diagrams describing interrupt routines of the program of FIG. 3.

In FIG. 5 the timer interrupt routine is initiated when the timer is overflowed (block 400). In block 401 the microcprocessor tests whether a software timer increment instruction has been executed and exits to a block 408 to return to the main routine, and if not it exits to a block 402 to retire the main routine execution registers and then to a block 403 to increment a four-bit software timer area created in the RAM by "1". An interrupt software timer is incremented by "1" in block 404 to measure the time elapsed from the execution of the last vehicle speed interrupt routine. The microprocessor checks for the overflowing of the interrupt software timer in block 405 and exits to a block 406 to set a maximum 3-digit hexadecimal value (FFF) for detecting the interval between vehicle speed pulses since in this instance the pulse interval exceeds the value measured by the program. If not, the block 406 is skipped. The main routine execution register is restored in block 407 to allow control to return to the main routine.

Figure 6:
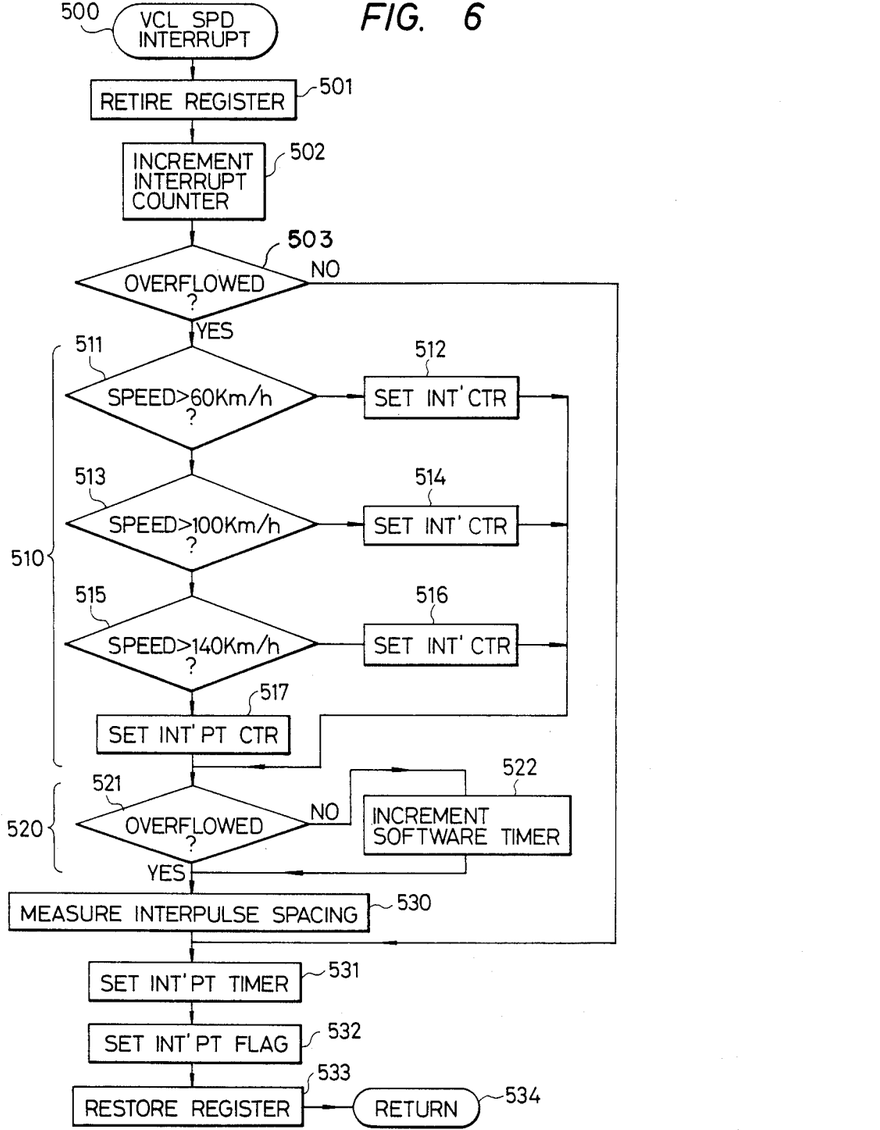
Figure 7:
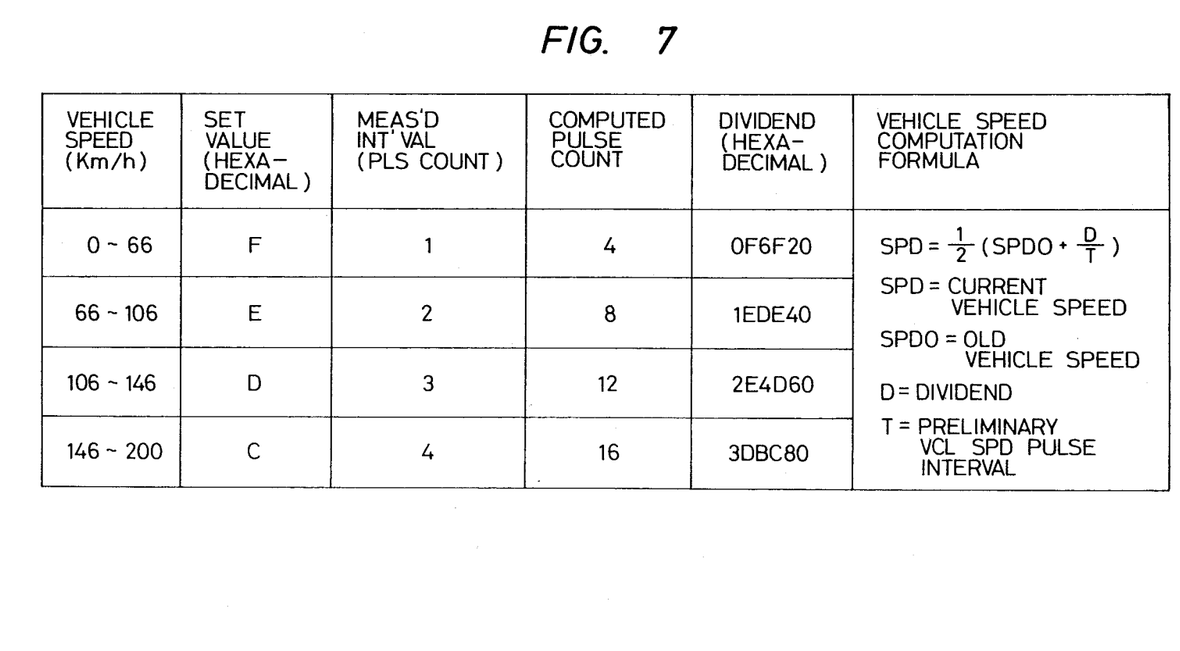
FIG. 7 is an illustration useful for describing the vehicle speed measurement of the invention.

In FIG. 6, the vehicle speed detect interrupt is initiated at step 500 to retire the main routine register at step 501. In block 502 a 4-bit interrupt counter created in the RAM is incremented and the overflowed condition of this counter is checked in block 503. In the presence of the overflowed condition, routines 510, 520 and 530 will be executed and in the absence of the overflowed condition, a block 531 will be executed. The routine 510 comprises blocks 511, 513, 515 and 517 for checking the vehicle speed against predetermined speed values and blocks 512, 514 and 516 for setting the interrupt counter to a predetermined hexadecimal value as shown in FIG. 7 to determine the vehicle speed pulses between which the pulse interval is to be measured. For example, the interrupt counter is set to a hexadecimal value F if the vehicle speed is lower than 66 km/h and in this case an overflow occurs at every one vehicle speed pulse so that the pulse interval to be measured corresponds to one interpulse spacing. If the vehicle speed is in a range between 66 km/h and 106 km/h, the interrupt counter is set to a hexadecimal value E to measure the interval corresponding to two interpulse spacing. Likewise, for vehicle speed ranges of 106 km/h–146 km/h and 146 km/h–200 km/h the interrupt counter is set to hexadecimal values D and C respectively for measuring the interval corresponding to three and four interpulse spacings.

The routine 520 comprises a software timer overflow check step 521 and a software timer increment step 522 to increment the 4-bit software timer when overflow occurs in the 8-bit software timer to create a 12-bit timer. This eliminates errors which might occur in the measurement of intervals between vehicle speed pulses.

The pulse interval measuring routine 530 comprises the following three steps:

Step (1) for measuring the interval between the times of occurrence of the last and present interrupt routines;

Step (2) for storing the data obtained in Step (1) into a storage location of the RAM which corresponds to the oldest vehicle-speed interpulse spacing data;

Step (3) for storing the time of occurrence of the present interrupt routine; and Step (4) for executing the data stored in the Step (2).

After the derivation of data indicating vehicle speed, the control advances to a block 531 to reset the interrupt timer to a hexadecimal D to initialize the vehicle speed timer. Control now goes to block 532 to set an interrupt flag. The main routine register is restored in block 533 before returning to the main routine at block 534.

Returning to FIG. 3a, the microprocessor now executes a main routine start time check step in block 216 to allow time for the operation of manual switches (set, RESUME and cancel switches) and control valve and the computation of vehicle speed and exits to a block 217 at interval T2 which is twice the interval T1. In block 217 the terminal P1 of the microcomputer is raised to a high voltage level for triggering the failure detector 44.

Figure 3A:
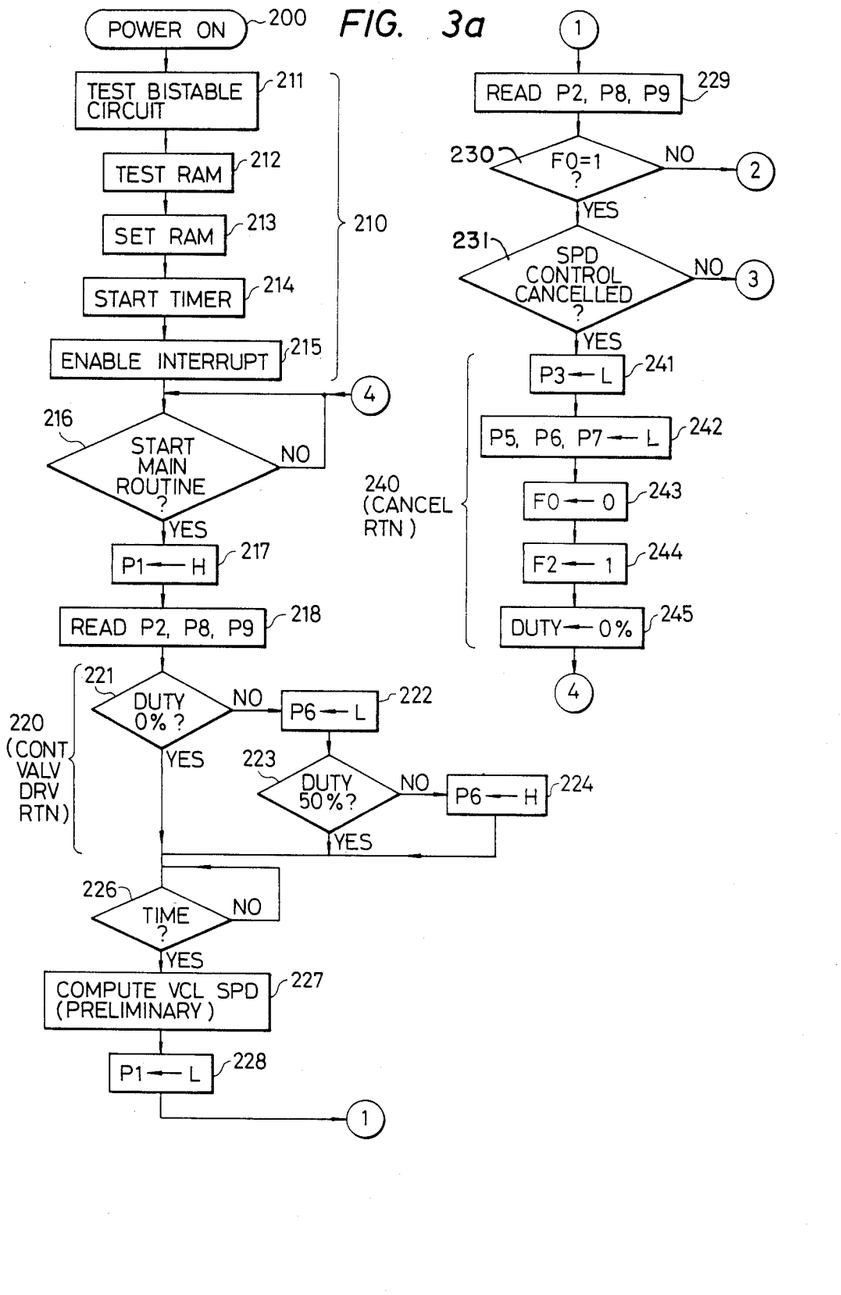

In block 218; the microprocessor receives data through input terminal P2, P8 and P9 from NOR gate 52 and switches 20 and 21 to eliminate the chuttering effect according to the following steps prior to the storage of data into the RAM:

Step (1) in which exclusive OR states are obtained from the binary states of the input data and those of the switches in succession;

Step (2) in which logical products are obtained from the data successively obtained in the Step (1);

Step (3) in which logical products are obtained from the logical product data obtained at Step (2) and the input data; and Step (4) which provides a bit invention of the product data obtained at Step (2) and logial products are obtained from the bit-inverted product data and the data obtained at Step (3) to use the last-mentioned product data as true operating states of the switches.

When the SET switch 20 is turned on the terminal P8 switches to a high voltage level which is written into the RAM. Likewise, signals from the stop switch 13, parking switch 17, neutral switch 18 and a signal from the stop fuse 12 are combined in the NOR gate 52 providing a cancelling signal to the P2 input of the microcomputer 110. At the same time operation of the RESUME switch 21 provides a high level signal to the P9 terminal and is written into the RAM.

Indicated at 220 is a control valve operating routine which comprises a block 221 to test whether the duty ratio of the control valve 2b of the throttle actuator 2 is 0%. If the control valve 2b is in de-energized state the duty ratio is 0%, control exits to a block 226 and if not, it exits to a block 222. In the block 226 the microprocessor checks whether a period of 27 milliseconds has elapsed from the start of the main routine to determine the schedule of the steps which follow and exits to a vehicle speed preliminary calculation step shown in block 227. In block 227 the microprocessor adds up four data obtained in the vehicle speed interrupt routine by performing the following steps:

Step (1) for clearing the interrupt flag;

Step (2) for summing up the four data;

Step (3) for checking whether the interrupt flag is zero and, if so, to proceed to the next step and if not, to return to the Step (1) since the non-zero condition indicates that a vehicle speed interrupt has occurred in the process of computations of the vehicle speed pulse data and producing an error.

In this way, vehicle speed data are written into the RAM at periodic intervals. In block 228 the output port P1 of the microcomputer is switched to a low voltage level to reset the failure detector 44 which was set in block 217.

Figure 3B:
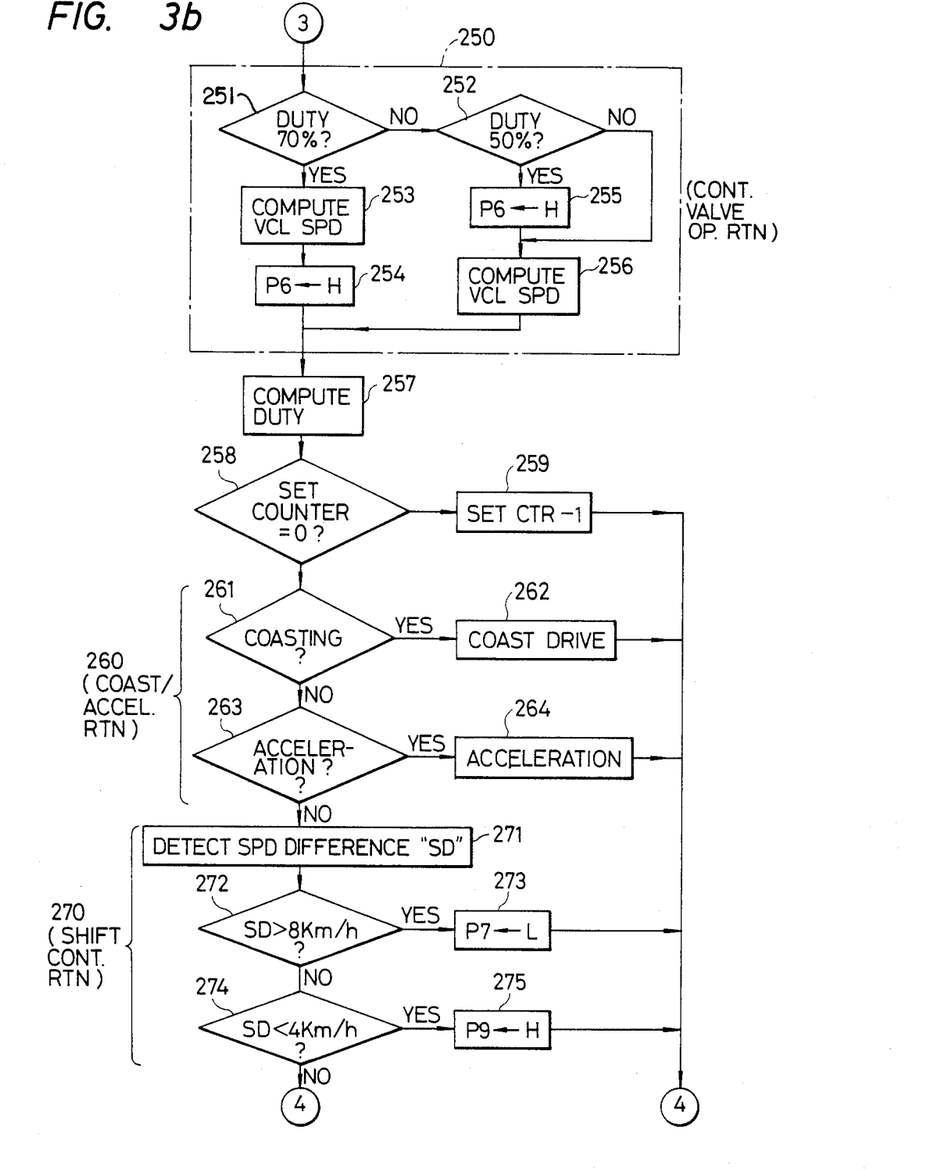
Figure 3C:
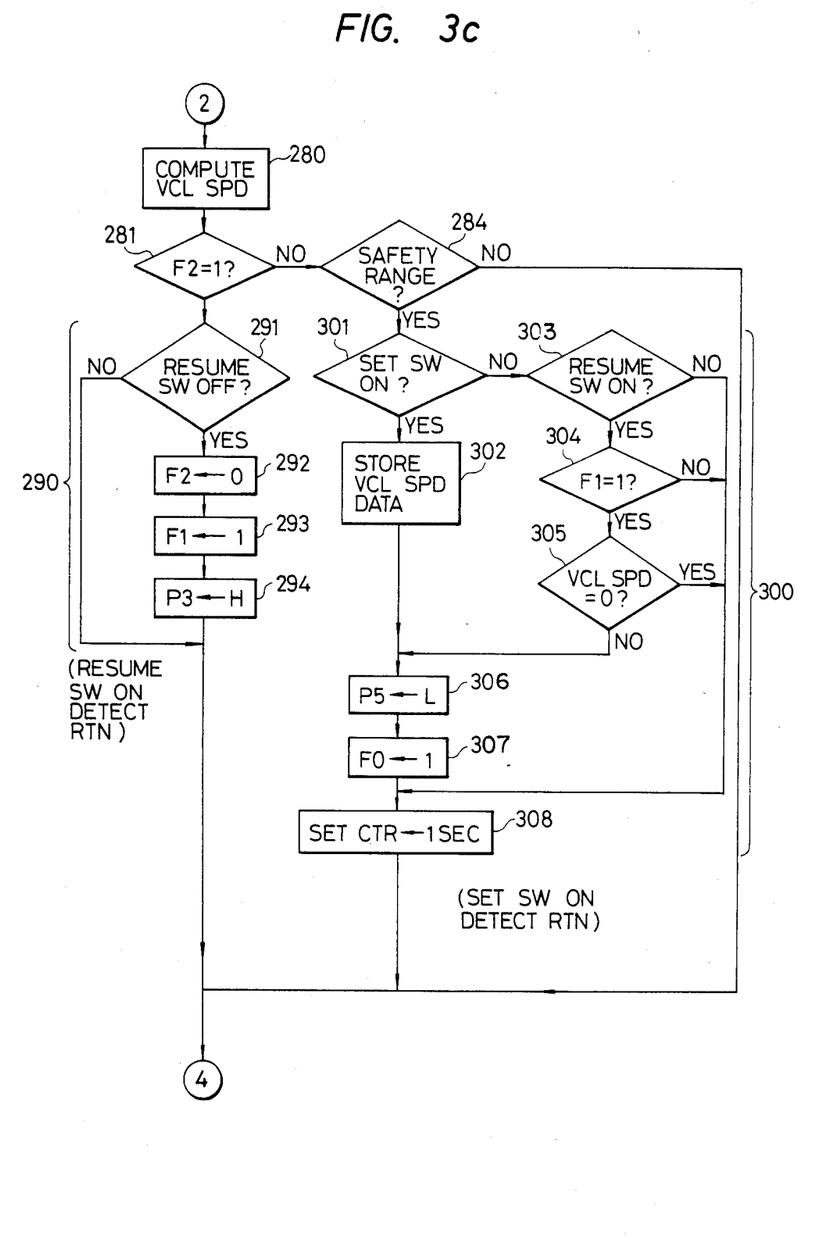
Figure 4:
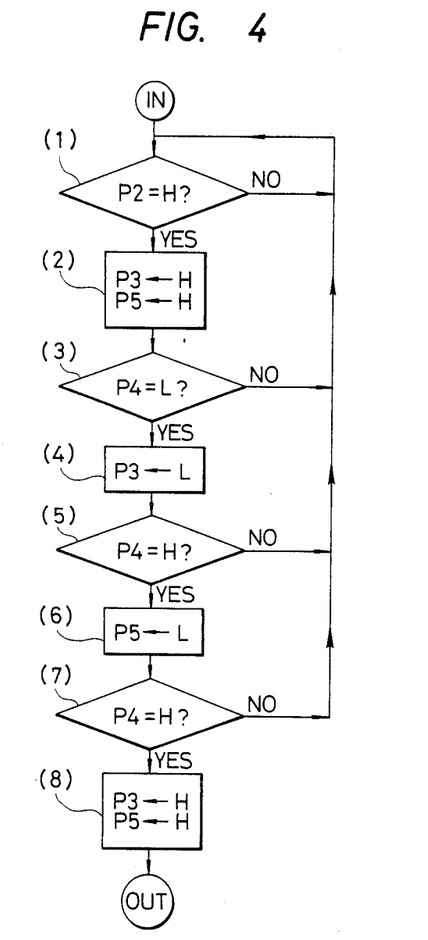
FIG. 4 is an illustration of a flow diagram describing the details of the memory inspection routine of FIG. 3.

Switch condition data on ports P2, P8 and P9 are written into the RAM in block 229 as in block 218 into the RAM. In block 230 the microcomputer checks whether the vehicle speed is under controlled state by applying a test whether a flag F0 is "1" and if so, it exits to a vehicle speed calculation block 280 in FIG. 3c, which the vehicle speed is derived from the result of the vehicle speed preliminary calculation data obtained at block 227. More specifically, the vehicle speed calculation routine 280 comprises the following steps:

Step (1) for transferring the previously obtained vehicle speed data to an old vehicle speed data storage area of the RAM;

Step (2) for setting dividends to hexadecimal values 0F6F20, 1EDE40, 2E4D60, and 3DBC80 as shown in FIG. 7 based on the vehicle speed data stored in the RAM;

Step (3) for resetting the calculated vehicle speed to 0 km/h if the preliminarily calculated hexadecimal value of the vehicle speed exceeds 3000 to proceed to a Step (6) described below and if otherwise to set the dividends to hexadecimal values 0F6F20, 1EDE40, 2E4D60, and 3DBC80;

Step (4) for dividing the dividends by the prelimiariy vehicle speed value to use the divided value as the valid calculated vehicle speed;

Step (5) for setting the valid calculated vehicle speed data to a hexadecimal value FFF if the speed exceeds 210 km/h; and Step (6) for deriving an average vehicle speed for use as the current vehicle speed by summing the previous vehicle speed data and the valid calculated value and dividing the summed value by 2 and storing the avarage value in the RAM.

The above calculation is completed in a period of about 10 milliseconds.

The microprocessor now proceeds to a block 281 to check whether a "cancel" flag F2 is set to "1" which indicates that the vehicle speed control is cancelled. If this occurs the control exits to a routine 290 in which it checks for the presence of a short-circuit condition in the circuit of RESUME switch 21, and if not it exits to a block 284. In block 284 the microprocessor determines whether the vehicle is in a predetermined saftey range (30 km/h to 110 km/h) by checking the current vehicle speed against predetermined values and exits to a routine 300 to detect the presence of a speed setting operation. If the vehicle speed is outside of the safety range, control returns to block 216.

The routine 300 comprises a block 301 in which the microprocessor checks if the SET switch 20 is operated to proceed to a block 302 to store the current vehicle speed data into the RAM and thence to a block 306. If the switch 20 is not operated, a block 303 is executed to check for the operation of the RESUME switch 21. In blocks 304 and 305 the microprocesssor checks for the presence of a flag F1=1 indicating that the resuming operation is permissable and the presence of vehicle speed data stored in the RAM. In block 306, a low voltage is applied to the output port P5 to trigger the AND gate 63 into a high output state since its input condition is satisfied by low inputs from the bistable circuit 60 and inverters 93 and 94 in the absence of a cancelling signal from the NOR gate 52 which would otherwise occur in response to the operation of various switches including the stop and parking switches 13 and 17. As a result, the transistors 65 and 68 are turned on energizing the solenoid 2a to put the actuator 2 into an operative condition.

Subsequently, a block 307 is executed to set the flag F0 to "1" to indicate that the microprocessor is now operating to control the vehicle speed based on the data thus obtained. In block 308 a hexadecimal number corresponding to the period of a second is placed in a set counter and control returns to block 216.

It is seen that during the time prior to speed control mode, the setting and resuming operations are disabled when the vehicle speed is outside of the safety speed range. Similarly, during the time immediately following the energization of the system by power switch 11, the RESUME enable flag F1 is zero and the vehicle speed data stored in the RAM is zero km/h, so that the operation of the RESUME switch 21 is also disabled.

During the next cycle reinitiated in block 216, the microprocessor goes through blocks 217, 218 and 221 to a block 222 to apply a low voltage signal to the output port P6 and a high voltage signal to the AND gate 70 via inverter 69. Since the other input of AND gate 70 is impressed with a high voltage from AND gate 63 in response to the execution of block 306 in the previous operating cycle, the transistors 72 and 75 are turned on to energize the control valve operating selenoid 2b.

The block 222 is followed by a block 223 in which the microprocessor checks whether the duty ratio of the solenoid 2b is greater than 50% to exit to the block 226, and if not it exits to a block 224 to wait for an interval of 10 milliseconds to place a high voltage to the output port P6 to de-energize the solenoid 2b. After executing the blocks 226 to 230, the microprocessor exits to a routine 231 to examine the cause of the cancelling action of the vehicle speed control which will be detailed hereinafter. In the absence of such cancelling actions, a routine 250 will be executed to provide vehicle speed calculation and control valve operation on a time shared basis. The routine 250 involves determining the amount of time in which the control valve is to be turned off by checking whether the duty ratio is in a range between 50% and 70% (blocks 251 and 252) and if so, block 255 is executed a high voltage is applied to the output port P6 after a 10-milisecond interval to de-energize the solenoid 2b in the same manner as in block 244. If the duty ratio is greater than a 70% value, the microprocessor goes to a block 253 to perform the calculation of vehicle speed and thence to a block 254 to perform the same function as stated in block 255.

After executing the routine 250, the microprocessor proceeds to a routine 257 to derive the duty ratio by executing the following steps:

Step (1) for subtracting the old vehicle speed value from the current value to determine the rate of change in speed;

Step (2) for limiting the speed variation rate value to 5 if exceeding this value;

Step (3) for determining a multiplier according to the binary states of P11 to P13;

Step (4) for multiplying the speed variation rate by the multiplier to predict the vehicle speed 0.5 to 2 seconds ahead of time;

Step (5) for detecting a speed error between the predicted vehicle speed value and the stored vehicle speed value;

Step (6) for determining a multiplier according to the binary states of input ports P14 to P16;

Step (7) for multiplying the speed error by the multiplier of Step (6) to obtain the amount of variation of the duty ratio;

Step (8) for setting a fundamental component of the duty ratio to a value in a range between 30% and 45% according to the binary states of input ports P17 and P18;

Step (9) for calculating a duty ratio value by summing the fundamental duty component with the duty variation;

Step (10) for limiting the calculated duty ratio value to 0% or 90% if it is below 0% or above 90% value, respectively; and Step (11) for obtaining an average of the successively calculated duty ratios and storing the average value in the RAM.

The microprocessor now goes to a block 258 to check for the content of the set counter to see if it is zero to exit to a routine 260 which involves checking whether the setting and RESUME switches are operated in blocks 261, 263 and executing blocks 262 and 264. In block 262 the duty ratio calculated in the routine 257 is updated to 0% and the stored vehicle speed is updated to the current value for coasting the vehicle. In block 264 the duty ratio obtained in the routine 257 is updated to 90% and the stored vehicle speed is updated to the current value and placing a low voltage to the speed change output P7 for accelerating the vehicle. The transistor 78 is turned on energizing the solenoid of the automatic transmission 4 for acceleration.

A shift control routine 270 is executed by detecting the difference between the stored and current vehicle speed data in block 271 and checking whether the difference is greater than 8 km/h in block 272 as in the case where the vehicle is slowed down as a result of an uphill drive, for example. A block 273 follows to apply a low voltage to the input port P7 to energize the transmission solenoid to increase the speed so that the speed difference is reduced. If the speed difference is lower than 8 km/h, a block 274 is executed to check whether it is lower than 4 km/h to exit to a block 275 to apply a high voltage to the port P7 to de-energize the transmission solenoid.

After the description of the microcomputer operating in a control-enabled mode now follows the description of the microcomputer operating in a cancelled or control-disabled mode.

If one of the following conditions occurs during the control-enabled mode the microprocessor exits from the block 231 to a cancel mode routine 240:

(a) If the vehicle speed deceased below the lower limit of 30 km/h;

(b) If the stop switch 13 is operated;

(c) If the parking brake switch 17 is operated;

(d) If the neutral switch 18 is operated;

(e) If the failure detector 100 senses a malfunction of the control valve operating solenoid 2b when this solenoid remains energized for an interval exceeding a predetermined value (a few hundreds milliseconds);

(f) If the failure detector 80 senses a malfunction of the transistors 68 and 75;

(g) If the bistable circuit 60 is in reset condition;

(h) If the voltage supplied from the stabilizer 23 is lower than a predetermined voltage level; and (i) If the microcomputer is not properly functioning.

The cancel mode routine 240 involves the steps of applying a low voltage to the output port P3 of the microcomputer in block 241 to reset the bistable circuit 60 and applying a low voltage to the output ports P5, P6 and P7 in block 242 to de-energize the release valve operating solenoid 2a, control valve operating solenoid 2b and transmission shift solenoid 4. In blocks 243 and 244 the control flag F0 is reset and the cancel flag F2 is set in succession. Finally, the duty ratio is set to 0% in block 245 to return to the starting block 216 of the main routine.

The microprocessor now operates in a control-disabled mode by executing the blocks 216 to 230 and blocks 280, 281 and exits to a routine 290 in which it checks for the presence of a short circuit condition of the RESUME switch 21. The routine 290 comprises the steps of checking the operating state of the RESUME switch 21 to repeat the above process by returning to block 216, and resetting the cancel flag F2 to "0" in block 292 if the RESUME switch 21 is in open condition and setting the resume enable flag F1 to "1" in block 293, and finally, at block 294 applying a high voltage to the output port P3 in block 294 to set the bistable circuit 60.

When the RESUME switch 21 is returned to the open condition during the cancel mode, the microprocessor will enable the RESUME switch 21 and exit from block 281 to block 284 in the next operating cycle of the program to accept command signals from the SET and RESUME switches 20 and 21.

What is claimed is:

1. A speed control system for a vehicle having an engine, the engine having a speed adjusting element controllable in response to a manual control means, comprising:

a speed sensor for generating a speed signal proportional to the speed of said vehicle;

a speed control means connected to said speed sensor for controlling the setting of said speed adjusting element in response to a speed control signal applied thereto;

manually operated entry means for generating a disabling signal;

monitor means connected to said manually operated entry means for detecting a first condition when said disabling signal is present, said monitor means connected to said speed control means for detecting a second condition when said speed control means is not operating properly, said monitor means generating a first coincidence signal when either said manual disabling signal is present or said speed control means is not operating properly;

coincidence gate means connected to said monitor means and to said speed control means for generating a reset control signal when there is a simultaneous occurrence of said first coincidence signal from said monitor means and a signal from said speed control means; and bistable means connected to said coincidence gate means for generating a signal for resetting said speed control means in response to said reset control signal from said coincidence gate means; said speed control means including data processing means for performing the steps of:

(a) verifying that said bistable means is operating properly;

(b) if said bistable means is verified, causing said bistable means to switch to the set condition and applying a signal as said second input signal to said coincidence gate means to allow said coincidence gate means to respond to the said first input signal;

(c) deriving a difference signal representing the difference between the speed of the vehicle given by said speed signal and a desired speed and applying the difference signal as said speed control signal to said adjusting element so that the vehicle speed is automatically controlled to said desired speed; and (d) detecting when said bistable means is in the reset condition; and (e) repeating the steps (c) and (d) until the reset condition is detected in the step (d), said speed control means being inhibited when said reset condition is detected.

2. A speed control system for a vehicle having an engine, the engine having a speed adjusting element controllable in response to a manaul control means, comprising:

a speed sensor for generating a speed signal proportional to the speed of said vehicle;

a speed control means connected to said speed sensor and having a first element for controlling the setting of said speed adjusting element in response to a speed control signal applied thereto and a second element for controlling the coupling of said first element to said speed adjusting element;

manually operated means for generating a disabling signal;

monitor means connected to said manually operated entry means for detecting a first condition when said disabling signal is present, said monitor means being connected to said speed control means for detecting a second condition when said speed control means is not operating properly, said monitor means generating a first coincidence signal when either said manual disabling signal is present or said speed control means is not operating properly;

coincidence gate means connected to said monitor means and to said speed control means for generating a reset control signal when there is a simultaneous occurence of said first coincidence signal from said monitor means and a signal from said speed control means;

bistable means connected to said coincidence gate means for generating a signal for resetting said speed control means in response to said reset control signal from said coincidence gate means; said speed control means including data processing means for performing the steps of:

(a) verifying that said bistable means is operating properly;

(b) if said bistable means is operating properly, causing said bistable means to switch to the set condition for preconditioning said second element to be enabled and applying a signal as said second input signal to said coincidence gate means to enable said coincidence gate to respond to said first input signal;

(c) enabling said second element to couple said first element to said speed adjusting element;

(d) deriving a difference signal representing the difference between the speed of the vehicle given by said speed signal and a desired speed and applying the difference signal as said speed control signal to said first element so that the vehicle speed is automatically controlled to said desired speed; and (e) detecting when said bistable means is in the reset condition and disabling said second element so that said first element is decoupled from said speed adjusting element to allow said manual control means to control said speed adjusting element.

3. A system as claimed in claim 1 or 2, wherein said speed sensor comprises means for generating pulses at a frequency proportional to the speed of said vehicle, and said processing means is programmed to perform the following steps:

(a) counting said pulses to detect the speed of said vehicle;

(b) selectively counting said pulses as a function of said detected speed;

(c) measuring the interval between said selectively counted pulses; and (d) utilizing the measured interval to derive the speed of said vehicle.

4. A system as claimed in claim 3, wherein the step (b) comprises the steps of successively checking the detected vehicle speed against each of a plurality of reference values to detect a match therebetween, generating a full count value in response to said match, and counting said pulses generated by said pulse generating means to generate an output signal when said full count value is reached to allow the step (c) to measure the interval between successive ones of said output signal.

5. A system as claimed in claim 3, wherein the step (d) comprises deriving an average value of the measured intervals.

6. A system as claimed in claim 1 or 2, wherein said data processing means includes means for performing the steps of detecting when said speed signal is outside of a predetermined range and applying a signal to said coincidence gate means as said first input signal.

7. A system as claimed in claim 1 or 2, wherein said data processing means includes means for performing the steps of detecting when said system is powered, detecting when said bistable means is in the reset condition and disabling said speed signal.

8. A system as claimed in claim 1 or 2, wherein said data processing means includes means for performing the step of generating a pulse each time an operation is completed, and said monitor means includes timing circuit means responsive to said pulse for detecting when said pulse is not generated at predetermined intervals and applying a signal to said coincidence gate means as said first input signal.

9. A system as claimed in claim 8, wherein said monitor means further includes means responsive to the output of said timing means for resetting said data processing means to reinitiate the execution of the steps.

* * * * *